United States Patent [19]

Cochran

[11] Patent Number: 5,007,838

[45] Date of Patent: Apr. 16, 1991

[54] TACTILE ENHANCEMENT METHOD FOR PROGRESSIVELY OPTIMIZED READING

[75] Inventor: Kirby Cochran, Provo, Utah

[73] Assignee: American Business Seminars, Inc., Provo, Utah

[21] Appl. No.: 482,388

[22] Filed: Feb. 20, 1990

[51] Int. Cl.$^5$ .......................................... G09B 17/00
[52] U.S. Cl. .................... 434/178; 434/179
[58] Field of Search .............. 434/178, 179, 319, 236; 381/73.1

[56] References Cited

U.S. PATENT DOCUMENTS

| | | | |
|---|---|---|---|
| 2,777,901 | 1/1957 | Dostert | 179/100.2 |
| 3,038,120 | 6/1962 | Bernstein et al. | 324/68 |
| 3,093,914 | 6/1963 | Bernstein | 35/35 |
| 3,368,551 | 2/1968 | Hardyck | 434/178 X |
| 3,672,074 | 6/1972 | Huffstetter | 35/35 H |
| 3,745,674 | 7/1973 | Thompson et al. | 35/9 R |
| 3,968,576 | 7/1976 | Taylor | 35/35 B |
| 4,035,930 | 7/1977 | Lambert | 35/22 R |
| 4,055,908 | 11/1977 | Greene et al. | 35/35 R |
| 4,078,319 | 3/1978 | Mazeski et al. | 35/35 R |
| 4,189,852 | 2/1980 | Chatlien | 434/178 |
| 4,354,841 | 10/1982 | Meeder | 434/157 |
| 4,421,488 | 12/1983 | Parlenvi et al. | 434/185 |
| 4,759,720 | 7/1988 | Niemoller | 434/319 |
| 4,775,322 | 10/1988 | Behunin | 434/179 |
| 4,777,529 | 10/1988 | Schultz et al. | 434/319 X |

FOREIGN PATENT DOCUMENTS

| | | |
|---|---|---|
| 1237679 | 6/1960 | France . |
| 2588985 | 10/1985 | France . |
| 993970 | 6/1965 | United Kingdom . |

*Primary Examiner*—Richard J. Apley
*Assistant Examiner*—Jennifer L. Doyle
*Attorney, Agent, or Firm*—Lynn G. Foster

[57] ABSTRACT

A method and system for enhancing reading skills whereby readers can improve both reading speed and comprehension. This novel teaching method and system associatively combines input to visual, tactile, and auditory senses. The reader is trained to conceptualize the meaning of words directly from symbols rather than from symbols and related sounds by causing the eyes to scan text more rapidly than both symbols and related sounds can be assimilated. The eyes are prompted to follow a rapidly moving finger induced to rhythmically move back-and-forth across the text at rapidly driven rates by an auditory beat. Different auditory inputs are provided to each ear, such that each hemisphere of the brain predominately receives signals which are related to its primary function. For example, rhythmic beats to induce higher reading rates are addressed to the left hemisphere of the brain which governs spatial relations, time, and rhythm. At the same time, subliminal motivational messages are addressed to the right hemisphere of the brain which interprets creative expression. Background music and other soothing sounds are added to the auditory input to block aural interference and create a better learning environment.

15 Claims, 1 Drawing Sheet

TACTILE ENHANCEMENT METHOD FOR PROGRESSIVELY OPTIMIZED READING

FIELD OF INVENTION

This invention relates to a system and method for improving reading speed and comprehension. In particular, it relates to a method which takes advantage of functional modal differences in the two sides of the brain, associatively and correlatively combining input to sight and tactile senses with synchronized, but independent auditory input to each ear and, therefrom, to the two hemispheres of the brain, to train individuals to read faster with better comprehension.

PRIOR ART AND BACKGROUND

Early reading skill is usually developed using vocalization techniques whereby the student first learns to "sound out" words. Even after silent reading skills are developed, readers usually continue to mentally sound out each word. This process is called subvocalization. Time required to subvocalize each word generally restricts the mastery of higher reading speed and comprehension.

In addition to subvocalization, reading also involves two other processes, translation and placement. Translation involves part-of-speech classification, building a mental image of the meaning of the word, and subliminally bringing to mind related words and images. Placement involves determining the context of the word in the sentence or text being read. Subvocalization is the only one of the three processes not required when reading, although translation and placement may be expanded beyond words to groups of words and phrases.

Eye movement during sight reading is not linear, but interrupted movement as the eyes jump from one point on a line to another, stopping momentarily to gather information before jumping to the next point. Each time the eye stops is called "fixation". The human eye is capable of five to six fixations per second. At each fixation, the average reader can subvocalize, translate, and place about three words. Better subvocalizing readers who can read four words per fixation have a maximum reading speed under 1500 words per minute.

It has been found that readers who read above 1500 words per minute do not go through the entire reading process (i.e. they do not subvocalize, translate, and place each word). Instead, they are able to grasp the meaning of an entire phrase or part or all of a sentence without having to read each word. This process, called "chunking", allows the reader to comprehend manifold times as much information as a reader who must read each word. All speed reading methods concentrate on breaking the subvocalization habit and replacing it with chunking proficiency.

Multiple sensory inputs have been used to assist readers to break the subvocalization habit. It has been proved that reading speed can be controlled and increased by moving a finger across each line of text. The reader's eyes automatically follow the path traced by the finger, even though it may move across the page more rapidly than the reader's fixation and ordinary scan rate. When practiced, this motion can cause subvocalization to be discarded in favor of reading words in groups, phrases, and sentences. Reading studies have shown that using the body's natural hand-eye coordination can greatly improve reading skills. Most speed reading methods teach hand-eye coordination.

In limited application in the past, auditory sensation has been combined with sense and touch to teach new methods of increasing reading speed. A method disclosed in U.S. Pat. No. 4,775,322 is directed toward cyclic stereophonic sound patterns which pan from left to right and right to left to pace reader's finger and eye movement across lines of text. Stereophonic transmission is used wherein volume is cyclically decreased in one speaker while being increased in the other to provide the sensation of movement from one side to the other to attempt to synchronize the rate of finger travel across lines on the page. In practice, however, this method has not produced significantly better results than methods which only use eye and finger movement.

The primary method of breaking the subvocalization habit comprises visual and tactile feedback of a finger (usually the index finger of the dominant hand) moving across a line of text too quickly for the mind to subvocalize each word. The eye automatically follows the path traced by the moving finger, even though it moves across the page much faster than the reader can read. Concentration upon the moving finger delivers text to the eye while tending to focus the mind on a single task. It is this rapid side-to-side motion that breaks the subvocalization habit and causes the reader to learn to read chunks of information.

The brain is divided into two hemispheres that perform very different functions, called hemispherical specialization. Although most thought is bilateral (i.e. it takes place on both sides of the brain), each hemisphere of the brain specializes to a degree in a specific type of thinking.

It is well known that the motor functions of the left side of the brain govern the right side of the body and vice versa. For example, when the left hand is raised, the electrochemical signal originated in the right side of the brain.

There is also hemispherical specialization in the manner in which the brain governs abstract thought. In most individuals, the right hemisphere is the center for art, music, and other forms of creative expression. Consistent with this, the right hemisphere is the center for processing the spoken word, rather than the written word. In these individuals, the left hemisphere governs logical, mathematical, businesslike thought, spacial relations, time, and rhythm. Although one must be careful not to overgeneralize, each hemisphere does have a greater influence over its own thought domain.

Messages can reach the brain subliminally without exciting conscious thought. The conscious mind evaluates, blocks, and otherwise disposes of received information it is unwilling to accept, while subliminal messages reach the brain unscreened and uninhibited. When these subliminal messages are used to motivate and reinforce learning activity, they are called subliminal affirmations. By bypassing the conscious mind, subliminal affirmations can have greater impact than conscious messages in a learning environment.

Recognizing potentially negative aspects of providing messages to the brain which are not consciously and inhibitively processed, it is recommended that all such subliminal affirmations be provided in written form to the learning reader for his or her perusal, before use. Another advantage of prereading subliminal affirmations in reinforced assimilation of the affirmations by the conscious and unconscious minds.

BRIEF SUMMARY AND OBJECTS OF THE INVENTION

In brief summary, this invention comprises a novel system and method for increasing reading speed and comprehension more rapidly and with better results than prior art proposals. Physiological tools comprising the senses of touch, sight, hearing and the specificity of the central nervous systems' neurological pathways are used. This invention teaches the reader to separate symbols from sounds. In other words, the readers learns to conceptualize without translating the symbols (written words) into sounds, thereby overcoming the habit of subvocalization. By translating symbols directly into concepts, the reader may increase his reading ability tenfold.

Rhythmic hand movement is a key factor in learning to read chunks of information rapidly. This invention provides a novel method of inducing rhythmic hand movement while subliminally reinforcing learning conditions with uninhibited auditory input.

This method comprises novel teaching means which provide different auditory signals to each ear to further stimulate the learning activity. To the ear which is most directly connected to that hemisphere of the brain which handles time and rhythm, a signal comprising rhythmic beats, which reinforce the rate at which the reader's finger is to be moved to scan the text, is sent. Novel, barely audible signals comprising subliminal affirmations are dispatched to the other ear. As a result, subliminal affirmations addressed to the left hemisphere of the brain are sent to the right ear and rhythmic beats addressed to the right hemisphere of the brain are sent to the left ear. Both hemispheres are involved in receiving signals from both ears because auditory pathways are somewhat diffuse. However, by sending an independent auditory signal to each ear, a measure of control is gained over how the messages are interpreted and used to reinforce the learning process.

Additional auditory input comprising background music is provided to block out aural interference and further provide a soothing environment which allows greater concentration on improving reading skills.

Accordingly, it is a primary object to provide a novel system and method for increasing reading speed and comprehension by employing finger movement and associated tactile sensation to stimulate eye movement.

It is a significant object of the invention to cause the finger to move across the text at rates greater than the eye can assimilate if the reader practices subvocalization.

It is a further dominant object to cause habits which slow the reading process comprising subvocalization to be broken and replaced with chunking skills.

It is an important object to provide at least one form of auditory stimuli to one ear addressed for delivery through that ear's central nervous system pathways to one hemisphere of the brain and another form of auditory stimuli to the other ear addressed for delivery through the second ear's central nervous system pathways to the other hemisphere of the brain.

It is a principal object to provide an audible beat to the reader's ear which has the best contact through central nervous system pathways to the hemisphere of the brain which governs thought related to time and rhythm to associatively stimulate the rate of finger movement across a page of text.

It is a further principal object to send subliminal affirmation signals to the reader's ear which has the best contact through central nervous system pathways to the hemisphere of the brain which governs creative thought.

It is a meaningful object to provide background music to block aural interference and provide a soothing auditory learning environment.

It is a major object to provide a system and method which allows the reader a measure of control over the tempo of the audio beat.

These and other objects and features of the present invention will be apparent from the detailed description taken with reference to accompanying drawings.

DETAILED DESCRIPTION OF THE ILLUSTRATED EMBODIMENT

Figure 1:
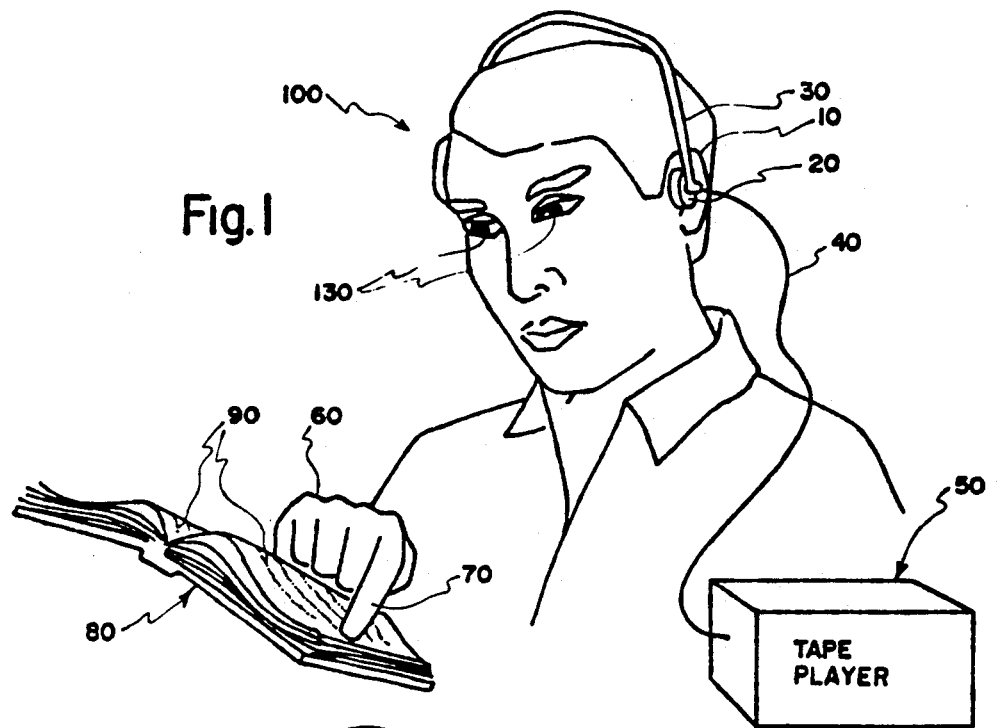
FIG. 1 is a frontal view of a reader wearing stereophonic earphones.
Figure 2:
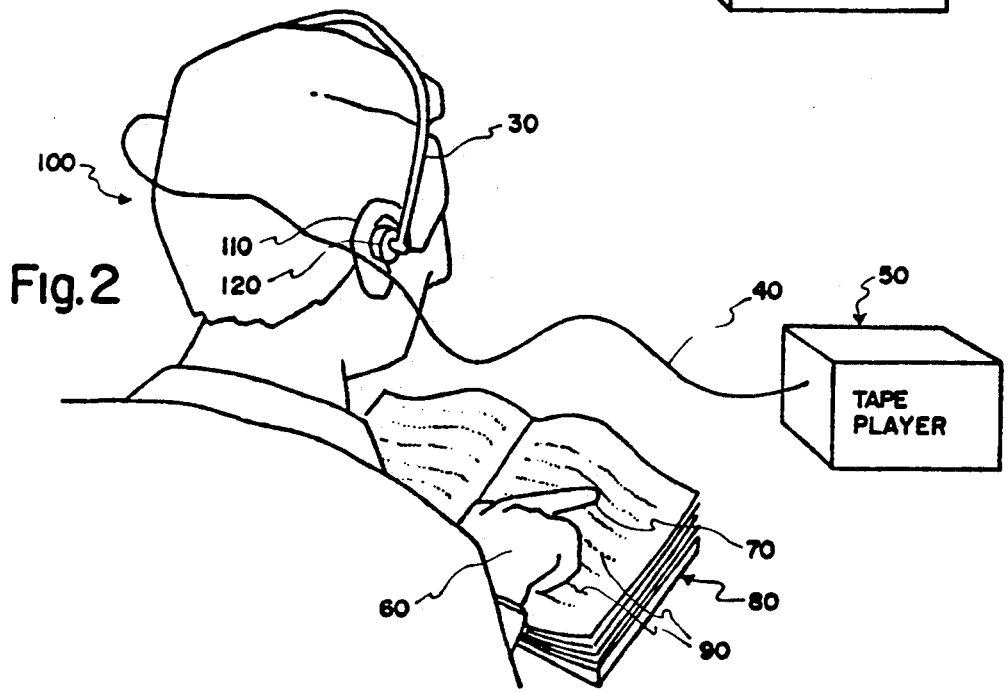
FIG. 2 is a rear view of the same reader shown in FIG. 1.
Figure 3:
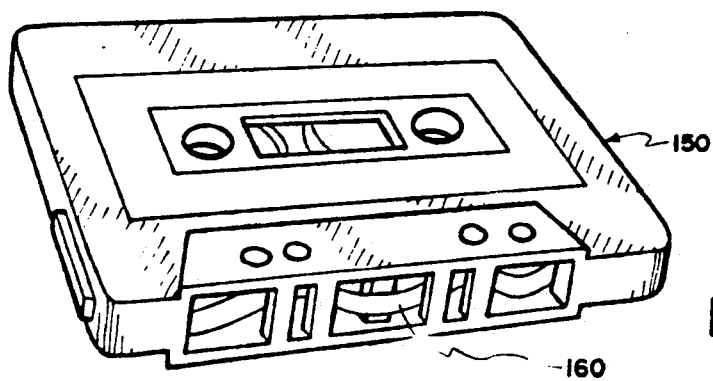
FIG. 3 is a perspective view of an audio tape cartridge.

Reference is now made to the currently preferred embodiment illustrated in FIGS. 1-3 wherein like numerals are used to designate like parts throughout. As can be seen in the Figures, apparatus required to implement the present method comprise book 80, tape cassette 150, stereophonic tape player 50, and headset 30 comprising stereophonic earphones comprising left speaker 20 and right speaker 120. The illustrated apparatus can comprise selections from a number of conventional audio playback systems, recordings, and conventional stereophonic headsets. Teh sterophonic signals recorded on the recordings, in the illustrated case tape 160 of tape cassette 150, are an integral part of the method and must be properly prerecorded.

Setup for the method comprises selecting an audio tape cassette 150 comprising prerecorded tape 160 which comprises signals which effect a desired reading rate. The tape also comprises the method's other auditory signals which are described later in the specification.

Audio tape cassette 150 is inserted into tape recorder 50 which is stereophonically connected through electrical cable 40 to headset 30 comprising speakers 20 and 120. Speaker 20, mounted on the left side of reader 100, addresses information primarily to the right hemisphere of the brain through left ear 10. Spearker 120, mounted on the reader's right side, addresses the left hemisphere of the brain through right ear 110. Book 80 is placed at a comfortable reading distance from the eyes 130 of reader 10. Index finger 70 of dominant hand 60 is positioned just below the first line to be read of text 90. In lieu of the finger, a stick, pencil or other object may be manually held and used. Tape player 50 is turned on, and reading-training begins.

The reading-training method comprises correlatively and associatively combining activity of senses comprising visual, tactile, and auditory to break subvocalization habits and acquire greater chunking skills. To accomplish this, finger 60 is stimulated to move across text 90 at controlled, but increasing rates. Reader eyes 130, attempting to follow finger 60, ultimately cannot assimilate words rapidly enough to be subvocalized. As a natural consequence, reading by chunking replaces subvocalization, resulting in higher reading rates and comprehension.

Reading skills improve more rapidly when finger 60 movement is rhythmic. Rhythmic movement is primarily interpreted and incited by thought processes in the left hemisphere of the brain which embraces thought processes comprising spatial relations, time, logic, and mathematics. The prerecorded tape 160 channel which comprises rhythmic beat signals is monophonically connected to speaker 120 and broadcasts to right ear 110 wherefrom audible signals are addressed to the left hemisphere of the brain.

The other prerecorded tape 160 channel is connected to left ear 10 through speaker 20. Subliminal affirmations which are too quiet to be heard consciously, but which are discernable subconsciously, are addressed to the right brain, thereby. Subliminal affirmations enter the mind without being evaluated, blocked or otherwise screened to inhibit processing of data the conscious mind is unwilling to accept. Printed lists of all subliminal affirmations are provided for reader 100 to consciously read before training begins such that the contents of subliminal affirmations are known and can be correlated by the conscious and subconscious minds during training.

Prerecorded tape 160 also provides background music for purposes comprising blocking aural interference and soothing and calming auditory environment to enhance the concentrating and learning conditions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A system for increasing reading speed and comprehension comprising:

stereophonic audie playback means comprising separate earphone means for each ear;

prerecorded stereophonic audio recording means, compatible with use in said stereophonic audio playback means the recording means providing different kinds of audio signals to each ear, said recording means comprising:

one stereophonic channel means which comprises subliminal affirmation signals and background signals which reduce aural interference, for delivey to one ear of a reader;

second stereophonic channel means which comprises tempo signals, to set a reading material scan rate to a pace which discourages word subvocalization and encourages reading of blocks of words, and background signals which reduce aural interference, for delivery to a second ear of the reader.

2. A method which associatively stimulates a reader's senses comprising auditory, visual, and tactile to increase reading speed and comprehension, said method comprising the steps of:

causing the reader to ingest reading material as his finger travels across a page;

providing a reader-training prerecorded stereophonic audio recording which comprises two separate and independent channels of prerecorded signals, the prerecorded signals collectively comprising reading-rate-setting signals, subliminal affirmation signals, and aural interference reduction signals;

delivering the reading-rate-setting signals to only one ear and thence directly to one hemisphere of the brain of the reader to stimulate and focus rapid reader eye movement in conjunction with rapid tactile scanning of sequential lines of print on a page of written material at rates which suppress the tendency for subvocalization of individual words;

delivering the subliminal affirmation signals predominately related to the spoken word to one ear only and thence directly to one hemisphere of the brain;

delivering aural interference reduction signals to both ears and of the reader to reduce the detrimental effect of external noise.

3. A method according to claim 2 wherein the reading-rate-setting signals are delivered only to the right ear for direct communication to the left hemisphere of the brain.

4. A method according to claim 2 wherein the subliminal affirmation signals comprise vocal comments and are delivered only to the left ear for direct communication to the right hemisphere of the brain, said vocal comments being too quiet to be heard consciously but loud enough for the subconscious mind to hear and interpret the message.

5. A method for controlling and increasing a reader's reading and comprehension rate comprising the steps of:

stimulating each ear with distinctly separate sound pattern signals by:

delivering rhythmic beat signals to one ear such that the hemisphere of the brain to which said ear primarily communicates receives said beat signals and said beat signals are substantially unprocessed by the nerve pathways and associated portions of the hemisphere of the brain directly related to the other ear;

simultaneously delivering subliminal message signals to the other ear such that the hemisphere of the brain to which this second ear primarily communicates receives and processes said subliminal message signals without substantial preprocessing of the same information by the nerve pathways prior to arrival at the hemisphere of the brain directly related to the other ear;

moving a finger a pointing means across a written text at rates consistent with said rhythmic beat signals;

visually scanning said written text at rates congruent with the finger movement rate, said rate being incompatible with subvocalization, to thereby stimulate reading and comprehension of blocks of words.

6. A method according to claim 5 wherein said rhythmic beat signals are delivered to the right ear and thence primarily to the left hemisphere of the brain to set a pace for reading.

7. A method according to claim 5 further comprising the step of selectively adjusting the reading rate by changing the tempo of the rhythmic beat means.

8. A method according to claim 5 wherein the subliminal affirmation signals are delivered to the left ear for delivery primarily to the right hemisphere of the brain.

9. A method according to claim 5 wherein said subliminal affirmation signals are delivered at audio sound levels which are too quiet to be heard consciously but loud enough to be heard and interpreted by the subconscious mind.

10. A method according to claim 5 wherein the delivering steps comprise communicating additional sound pattern signals comprising music in combination with rhythmic beat signals to one ear and in combination with subliminal affirmation signals to the other ear to block out aural interference.

11. A method according to claim 10 wherein said music comprises soothing auditory background signals which stimulate higher reading rate and better comprehension.

12. A method for audibly stimulating each hemisphere of the brain separately and differently to control and increase the reading rate and comprehension during reading training comprising the steps of:

delivering reading rate determining stimuli signals to one ear;

concurrently delivering subliminal affirmation signals to the other ear.

13. A method according to claim 12 wherein said stimuli signals and said affirmation signals comprise soothing auditory background sound signals which block aural interference and which stimulate a higher reading rate and better comprehension.

14. A method for audibly stimulating each hemisphere of the brain separately and differently to control and increase the reading rate and comprehension comprising the steps of:

delivering reading rate determining stimuli signals, for assimilation by the right hemisphere of the brain, to the left ear; and delivering subliminal affirmation signals, for assimilation by the left hemisphere of the brain, to the right ear.

15. A method which associatively stimulates a reader's senses comprising auditory, visual, and tactile to increase reading speed and comprehension, said method comrprising the steps of:

causing the reader to ingest reading material as his finger travels across a page;

providing a reader-training prerecorded stereophonic audio recording which comprises two separate and independent channels of prerecorded signals, the prerecorded signals collectively comprising reading-rate-setting signals, subliminal affirmation signals and aural interference reduction signals;

delivering the reading-rate-setting signals to at least one ear and at least one hemisphere of the brain of the reader to stimulate and focus rapid reader eye movement in conjunction with rapid tactile scanning of sequential lines of print on a page of written material at rates which suppress the tendency for subvocalization of individual words;

delivering the subliminal affirmation signals predominately related to the spoken word only to one ear and, directly to one hemisphere of the brain of the reader;

delivering aural interference reduction signals to both ears and of the reader to reduce the detrimental effect of external noise.

* * * * *